Oct. 22, 1940.     N. J. FINWALL     2,219,101
OIL FILTER CIRCUIT
Filed March 28, 1938

INVENTOR.
Nelson J. Finwall
BY
ATTORNEY.

Patented Oct. 22, 1940

2,219,101

UNITED STATES PATENT OFFICE 2,219,101

OIL FILTER CIRCUIT

Nelson J. Finwall, Oakland, Calif.

Application March 28, 1938, Serial No. 198,359

7 Claims. (Cl. 196—16)

The invention relates to oil filters and more particularly to the type of oil filter used in the oil filter circuit in an automotive internal combustion engine.

An object of the present invention is to provide an oil filter of the character described which will remove all of the foreign particles from the oil in a manner more complete and effective than has been obtained with oil filters heretofore used and which will be particularly effective to remove the moisture and other foreign liquid content in the oil.

Another object of the invention is to provide in a device of the character described, a heating means for facilitating the moisture and foreign liquid extraction and which is so designed and arranged as to avoid the corrosion and carbon deposits which may substantially interfere with the operation of this type of device.

A further object of the invention is to provide a device of the character above wherein the oil is cooled prior to leaving the device, so that the same is returned to the crank case of the engine in a relatively cooled state.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Referring to said drawing.

Figure 1:
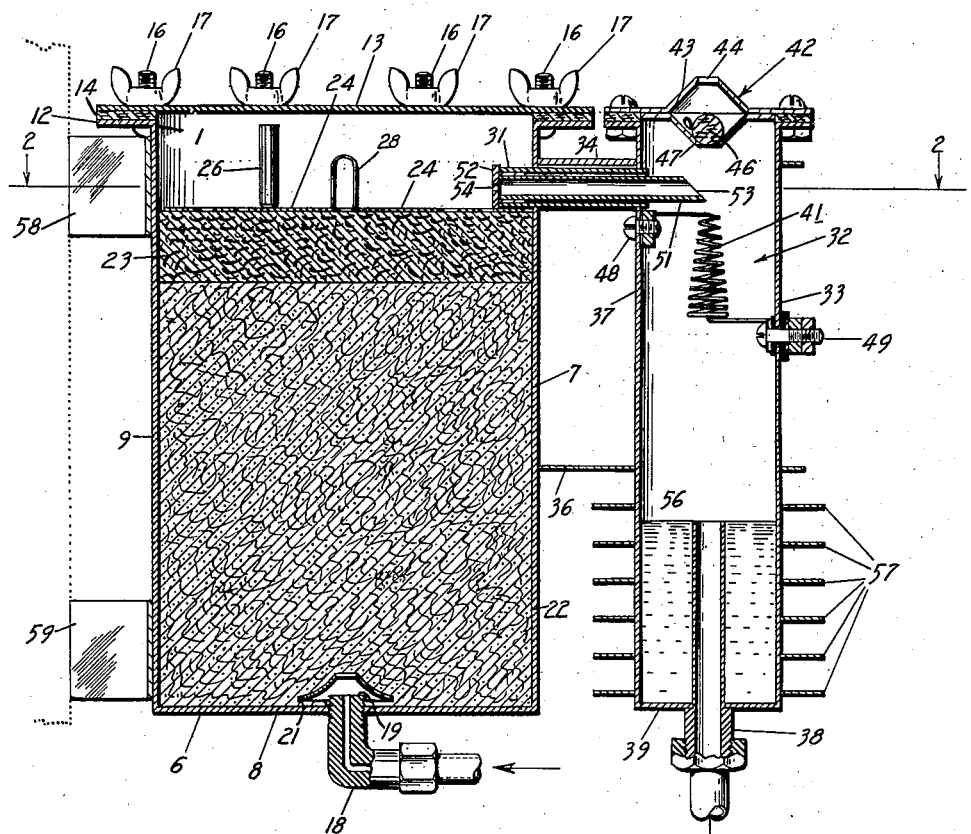
Figure 1 is a vertical cross sectional view of an oil filter constructed in accordance with the present invention.
Figure 2:
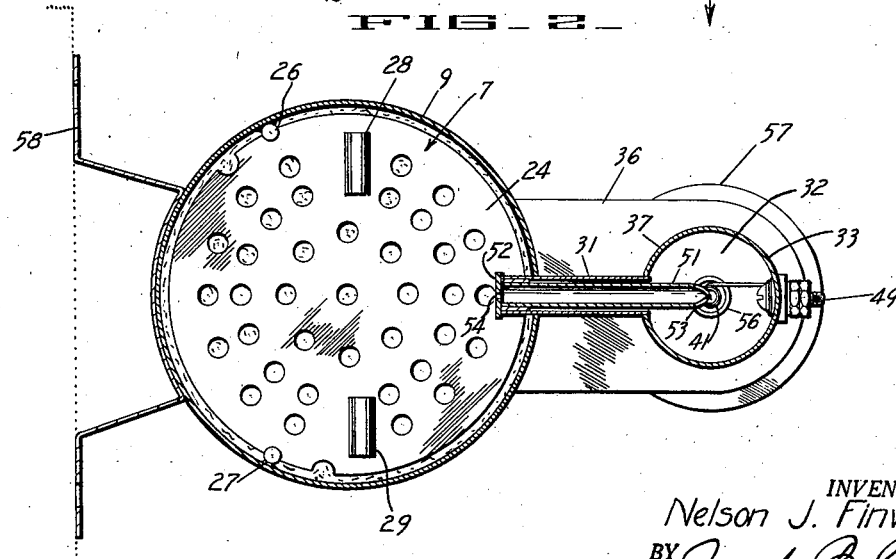
Figure 2 is a horizontal sectional view of the filter taken substantially on the plane of line 2—2 of Figure 1.

The oil filter of the present invention and as illustrated in the accompanying drawing, is particularly arranged for use in the oil filter circuit of an internal combustion engine such as used in automobiles and wherein the oil is pumped from the crank case through the filter and then returned to the crank case in an oil filtering circuit usually independent of the lubricating circuit of the engine. The filter as here shown consists briefly of a means providing a filter chamber having inlet and discharge passages and filter means therein for cleansing the oil passed through the chamber, and a second chamber connected to said discharge passage for receipt of filtered oil from the first chamber and which is provided with a heater means for vaporizing the moisture or other foreign liquids from the oil and venting means for discharging the water vapor from the chamber. Additionally, there is provided an oil discharge passage from the second chamber and cooling means for restoring the oil to a reduced temperature prior to returning to the crank case.

With reference more specifically to the accompanying drawing, the first chamber above mentioned is formed in a casing 6 providing a cylindrical interior chamber 7 and including a bottom wall 8 and a cylindrical side wall 9, the upper end 11 of the casing being left open and provided with a circumscribing flange 12 for support of a cover 13. A gasket 14 is preferably mounted between the cover and the flange 12 and the cover may be secured in place by means of a plurality of screws 16 and wing nuts 17. An oil inlet fitting 18 is connected to the bottom wall 8 of the casing substantially centrally thereof for introducing oil into the casing, and mounted over the inside end 19 of the fitting and within the casing is a disk shaped hood 21 for spacing an interior filler 22 of filter material from the end 19 of the fitting. Any suitable filtering medium may be used in the casing, although I prefer to use a loosely interwoven fibrous mass and preferably cotton waste for the majority of the filtering body, and in accordance with the present showing, such cotton waste is packed into the lower portion of the chamber below a felt disk 23 and a perforated supporting plate 24. The latter is held inwardly spaced from the cover 13 by means of lugs 26 and 27 on the interior of the wall 9 adjacent the end 11, and a pair of longitudinally extending projections 28 and 29 are on the plate to provide handle portions therefor. There is thus provided above the perforated plate 24 and under the cover 13, a chamber into which filtered oil accumulates for discharge. Extending from this latter chamber and through the side wall 9 of the casing is a discharge conduit 31 which provides a discharge passage for the filtered oil from the casing.

The filter provided by the unit 6 is highly effective for removing foreign particles from the oil, such as metal and carbon particles and dirt and dust and the like, but in addition to the cleansing of the oil of these particles, I provide for the additional extraction of foreign liquids and the water or moisture content in the oil. This latter feature is of great importance and has, to my knowledge, never been satisfactorily accomplished in the past. By reason of the breakdown of certain parts of the oil in the combustion chambers of the engine and due principally to the formation of water in the combustion gases, a substantial amount of water will, in the usual engine, find its way into the crank case. Similarly gasoline and other lighter petroleum fractions will pass by the pistons and into the crank case. The presence of these foreign liquids in the crank case is undesirable in that the lighter petroleum fractions will dilute the oil and the water will emulsify with the oil to in either case, materially lessen the lubricating quality of the oil.

The foreign liquid and moisture content in the oil is extracted in the present filter by the use of a second filter chamber 32, into which the filtered oil is passed and heated, so as to vaporize such liquid and moisture in the oil. Preferably, the chamber 32 is of elongated cylindrical form and is here provided in a casing 33 which is preferably mounted so as to position the longitudinal axis of the chamber 32 vertically. In the present construction, the casing 33 is fixed to the casing 6 and is supported therefrom by means of a pair of arms 34 and 36 which may be secured to the casings as by welding or the like. The discharge conduit 31 of the casing 6 is extended laterally through the side wall 37 of the casing 33, so as to provide an inlet passage for the chamber 32 and is connected to the casing adjacent the top of the chamber so as to afford a gravitation of the oil through the chamber. A discharge conduit 38 is mounted through the bottom wall 39 of the casing for returning the filtered oil to the crank case of the engine. In accordance with the present arrangement, I provide in the chamber 32 adjacent the oil inlet passage a heating means 41 for vaporizing liquid and moisture from the oil and the liquid and moisture so vaporized is allowed to escape from the chamber through a venting means 42 at the top of the chamber. This means is embodied in a cap 43 for the casing and in most instances, need consist only of an opening 44 through the cap, inasmuch as the oil entering the chamber 32 is at a very small pressure, and will normally lie entirely below the inlet passage to the chamber, leaving a space above the oil into which the vaporized liquid and moisture may rise and discharge through the perforate cap. In order, however, to prevent the discharge of oil through the opening 44 in the cap, should the oil level rise in the chamber 32, due for example to a blocking off of the line returning to the crank case, I provide in the cap a ball check valve 46 which is operative to raise into engagement with the opening 44, should the oil level rise in the chamber. As here shown, the ball valve is retained at the under side of the cap 42 by means of a perforate guard 47 and preferably, the ball valve is formed of a light weight material which will float on the oil, should the same ever rise in the chamber to the opening 44.

As an important feature of the present invention, I use as the heating means 41 an electric heater element which is grounded at one end 48 to the casing 33 and is connected at its opposite end to a terminal post 49 carried by the casing for connection to a source of electric potential, such as the battery or generator of the automobile engine. Preferably, the heater element is in the form of a helical coil and is mounted in the casing with its axis substantially coincident with the axis of the chamber and preferably, means is provided for directing the incoming oil directly to the upper end of the coil and through the center of the coil. This latter means is in the form of a conduit or nozzle 51, which is carried within the conduit 33, and preferably extends completely through such conduit and is provided with a head portion 52 within the chamber 6 and extends transversely into the chamber 32 to substantially the center thereof where the end 53 of the section is preferably cut on a bevel so as to discharge the oil directly on top of the electric coil 41. The coil may if desired and as here shown, be formed of conical longitudinal form so as to facilitate the passage of oil and water vapor therethrough. The head end 52 of the conduit 51 is arranged in accordance with the present construction, with a reduced opening 54 for regulating the pressure of the oil passing therethrough, and the size of this opening will vary with cars having different oil pump pressures. An advantage of the present construction lies in the fact that the nozzle 51 is removable and thereby permitting the use of various nozzles, having different size openings 54, with a single filter unit to render the latter adaptable to various oil pump pressures.

Preferably, the oil is cooled prior to the return of the same to the crank case, and at this end I incorporate a cooling unit in the bottom of the chamber 32. In the present construction this cooling chamber is formed by extending the inner end 56 of the discharge conduit 38 into the chamber 32 through the bottom wall 39 for a substantial distance above the bottom wall, so as to define between the conduit and the side wall 33 of the casing an annular cooling chamber in which the heated oil is brought in thermo-contact with the relatively cool exterior surfaces of the casing by way of the inner side wall of the casing and the conduit end 56 prior to discharge. The oil is retained in this annular chamber for a sufficient period to reduce the oil to a relatively cool state before being returned to the crank case. To facilitate this cooling action, I provide on the exterior of the casing 32 adjacent the lower end thereof a plurality of cooling fins 57.

It will now be clear that the filter of the present invention is highly effective for removing foreign particles and liquids and moisture from the oil and provides a compact unit for this purpose. It will be noted that the heating of the oil is confined exclusively to the second chamber of the device, whereby the filtering action of the first chamber is not interfered with, it being understood that the foreign particles are more readily removed from a cool oil than from a heated oil. Also, by using an electric heater element and by passing only the clean oil to this element, I have found that all corrosion and carbon deposits may be eliminated. The device may be mounted at any position in the engine compartment of an automobile and is preferably provided with mounting brackets 58 and 59 for this purpose.

While the use of the filter has been particularly referred to in connection with the oil filter circuit of an internal combustion engine, it will be clear that the filter may be used generally for other filtering and purification of oil.

I claim:

1. In a device for extracting foreign liquids from oil in a filter circuit, means providing an elongated vertical chamber having inlet and discharge passages adjacent the top and bottom respectively of said chamber and being arranged for connection of said inlet passage to a filter in said circuit for receiving filtered oil into said chamber, a vertically mounted electric heater coil in said chamber adjacent said inlet passage adapted to receive oil from said passage for gravitation of the oil over the convolutions of said coil for vaporizing foreign liquids from said oil, venting means at the top of said chamber for discharging vapor from said chamber, and cooling means adjacent the bottom of said chamber for cooling the oil discharged therefrom.

2. In a device for extracting foreign liquids from oil in a filter circuit, means providing an elongated vertical chamber having inlet and discharge passages adjacent the top and bottom respectively of said chamber and being arranged for connection of said inlet passage to a filter in said circuit for receiving filtered oil into said chamber, an electric heating coil having a vertical axis and mounted in said chamber with the top thereof directly under said inlet passage and adapted to receive said filtered oil and to conduct the same by gravity and adhesion around the turns of said coil for thinning said oil and vaporizing foreign liquids from said oil, and venting means mounted at the top of said chamber for discharging vapor therefrom.

3. In a device for extracting foreign liquids from oil in a filter circuit, means providing an elongated vertical chamber having inlet and discharge passages adjacent the top and bottom respectively of said chamber and being arranged for connection of said inlet passage to a filter in said circuit for receiving filtered oil into said chamber, an electric heater element mounted in said chamber adjacent said inlet passage and adapted to vaporize foreign liquids from said oil, a nozzle carried in said inlet passage and formed with a pressure regulating opening and operative to direct the incoming oil on said heater element and being removably carried in said inlet passage to permit use of various nozzles having various size pressure openings in said inlet passage, and venting means mounted at the top of said chamber for discharging vapor therefrom.

4. In a device for extracting foreign liquids from oil in a filter circuit, means providing an elongated vertical chamber having inlet and discharge passages adjacent the top and bottom respectively of said chamber and being arranged for connection of said inlet passage to a filter in said circuit for receiving filtered oil into said chamber, heater means in said chamber adjacent said inlet passage and adapted to vaporize foreign liquids from said oil and comprising an electrical heating coil mounted with its axis coaxial with the longitudinal axis of said chamber, means mounted in said inlet passage for directing the incoming oil to and onto the top of said coil, and venting means at the top of said chamber for discharging vapor therefrom, said coil having its lower turns of greater diameter than its upper turns to better hold the oil on the coil and against being thrown centrifugally from the coil.

5. In a device for extracting foreign liquids from oil in a filter circuit, a casing including top and bottom and side walls providing an elongated vertical chamber, an inlet conduit connected to said chamber adjacent the top thereof and being arranged for connection to a filter in said circuit for introducing filtered oil into said chamber, an electric heater element mounted in said chamber adjacent said conduit for receipt of oil therefrom for vaporizing foreign liquids from said oil, venting means at the top of said chamber for discharging vapor from said chamber, and a discharge conduit mounted longitudinally and centrally through said bottom wall and extending into said chamber to define an annular closed bottom space between the sides of said conduit and the side wall of said chamber for receiving and cooling said oil prior to discharge.

6. In a device for extracting foreign liquids from oil in a filter circuit, a casing including top and bottom and side walls providing an elongated vertical chamber, an inlet conduit opening to said chamber adjacent the top thereof and being arranged for connection to a filter in said circuit for introducing filtered oil into said chamber, an electric heater element mounted in said chamber adjacent said conduit for receipt of oil therefrom and adapted to vaporize foreign liquids from said oil, venting means at the top of said chamber for discharging vapor from said chamber, a discharge conduit extending centrally and upwardly into said chamber through said bottom wall to define an annular closed bottom space between the sides of said conduit and the side wall of said chamber for receiving and cooling said oil prior to discharge, and a plurality of cooling fins mounted on the exterior of said chamber wall adjacent the bottom thereof.

7. An oil filter of the character described for extracting foreign liquids having a lower boiling point than the oil, comprising, a casing providing an interior chamber, a substantially vertically extending electric heating coil mounted in said chamber and defining vapor passages interiorly and exteriorly of the coil and between the interior and exterior thereof, oil inlet means for said chamber positioned to deposit oil onto the upper end of said coil for gravitation of the oil over the convolutions of said coil to the lower end thereof, and oil discharge means for said casing.

NELSON J. FINWALL.